Figure 3:
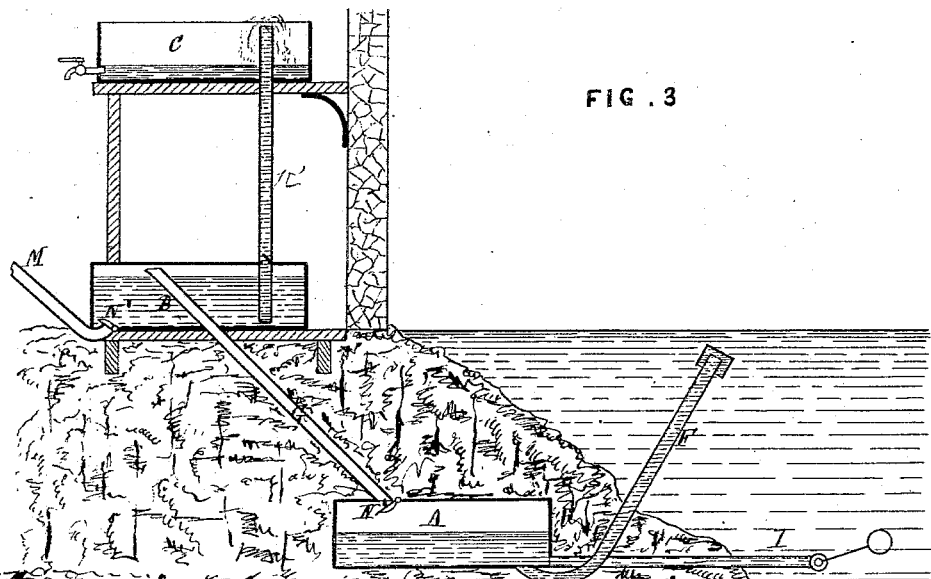

(No Model.)  C. M. WALKER.  2 Sheets—Sheet 1.
APPARATUS FOR UTILIZING THE RISE AND FALL OF THE TIDE.
No. 315,863.  Patented Apr. 14, 1885.
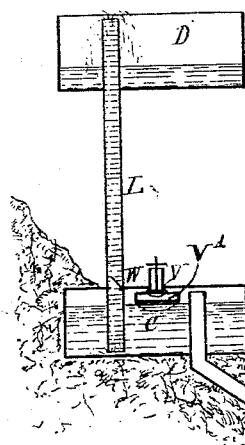
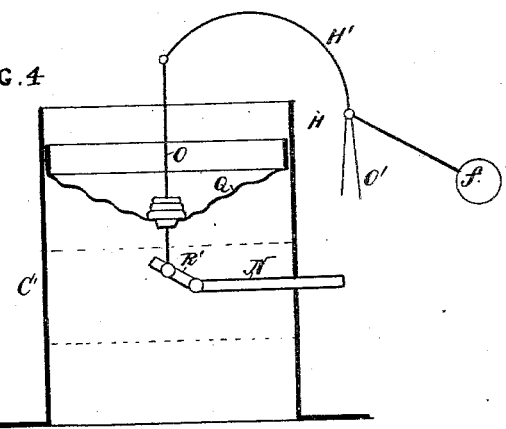
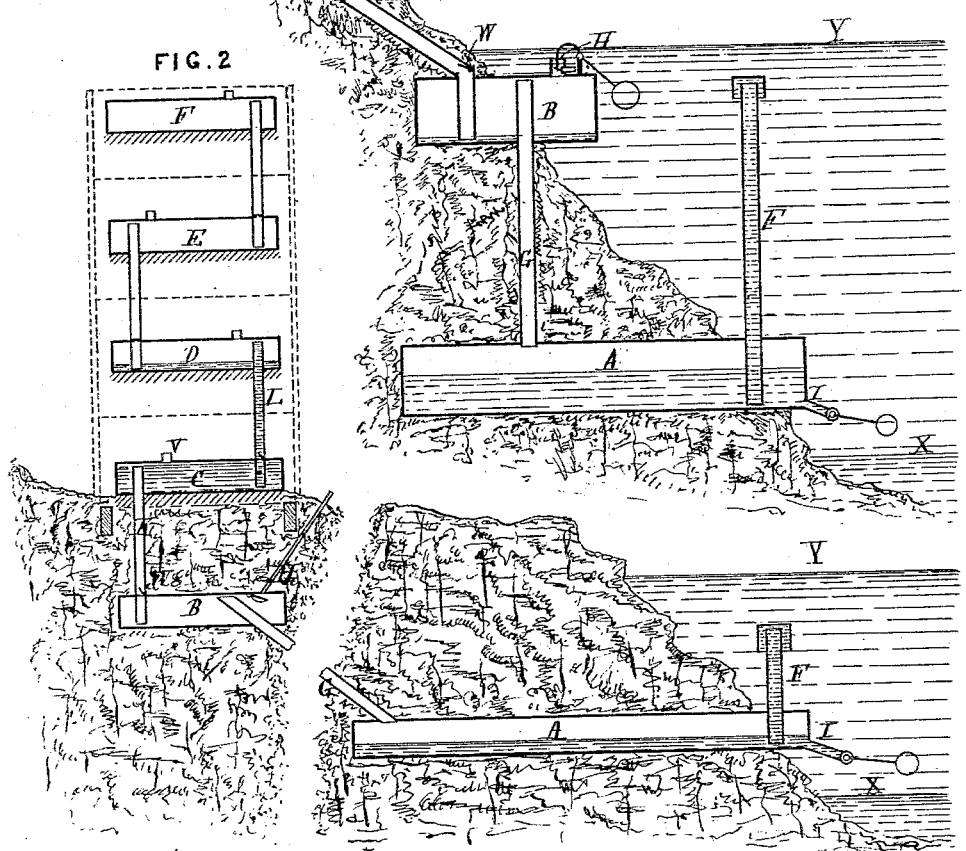
Witnesses.
J. A. Rutherford
Robert Eouett
Inventor,
Charles M. Walker,
By James L. Norris,
Atty.

(No Model.) 2 Sheets—Sheet 2.
C. M. WALKER.
APPARATUS FOR UTILIZING THE RISE AND FALL OF THE TIDE.
No. 315,863. Patented Apr. 14, 1885.

UNITED STATES PATENT OFFICE.

CHARLES MAYNARD WALKER, OF CANNON STREET, LONDON, ENGLAND.

APPARATUS FOR UTILIZING THE RISE AND FALL OF THE TIDE.

SPECIFICATION forming part of Letters Patent No. 315,863, dated April 14, 1885.

Application filed February 28, 1884. (No model.) Patented in England July 19, 1883, No. 3,560; in France January 14, 1884, No. 159,704, and in Belgium February 9, 1884, No. 64,105.

*To all whom it may concern:*

Be it known that I, CHARLES MAYNARD WALKER, a citizen of England, residing at Cannon Street, in the city of London, England, have invented improved means for utilizing the rise and fall of the tide or other rising and falling bodies of water for raising water or other liquids from one level to another, (for which I have obtained a patent in Great Britain, No. 3,560, dated July 19, 1883, and made application for a patent in France, dated January 14, 1884, in Belgium, dated February 9, 1884, and in Germany, dated February 2, 1884,) of which the following is a specification.

My invention has for its object to utilize the rise and fall of the tide or other rising and falling bodies of water for raising water or other liquids from one level to another, whereby the hydrostatic pressure due to the difference of height between the highest and lowest level of the water is made to compress air to a corresponding extent in a closed vessel or receiver communicating with a second closed vessel containing the water or other liquid to be raised, so that the compressed air in passing from the former to the latter vessel will force the water or other liquid contained therein to a height approximately corresponding to the head of water due to the said difference of height of the high and low water levels; and the invention consists in the construction and also the combination of parts, hereinafter particularly described and specified.

According to one mode of carrying out my invention, applicable for raising water or other liquid to any desired height above the high-water line, a closed tank or vessel is placed at or about low-water line, and has its interior in communication with the tide or other rising and falling body of water, so that at low water it is empty of water and filled with air, and as the water rises and enters the vessel it compresses the air therein. This vessel communicates by a pipe or passage with the upper part of a second closed vessel at a higher level, which second vessel, by means of an opening provided with a valve-cock or sluice, communicates either with the rising and falling body of water or with some other body of water or other liquid which it is desired to raise. This second vessel in its turn communicates by a pipe or passage with another vessel situated at the level to which it is desired to raise the water or other liquid. Thus assuming the second-named vessel to be charged with liquid, and the valve-cock or sluice to be closed, and that the first-named vessel is charged with air which is being compressed by the rising body of water entering the vessel, such compressed air in being forced into the second vessel will force the liquid therein up into the highest vessel, from which it is discharged to wherever required.

It will be evident in the above arrangement that the second or intermediate vessel must be situated at a height equal to or somewhat below the high-water line, and that the height of the highest or third vessel above the second vessel cannot be greater than the height between high-water and low-water levels. The second vessel, being situated at or about high-water level, is left full at every fall of the tide or other rising and falling body of water, the lowest vessel running dry. When it is desired to raise the water or other liquid to a still greater height, the third vessel is also closed and provided with a valve that remains open for the escape of air until the vessel is filled with liquid, whereupon it is closed either by hand or automatically by any known contrivance. This vessel is connected by a pipe or passage to a fourth vessel, which may be as high above the third vessel as this is above the second one, so that when the whole of the liquid has been forced from the second into the third vessel the compressed air from the first vessel (which must in this case have a capacity at least equal to the joint capacities of the second and third vessels) will find its way into the third vessel, and will force the liquid up into the fourth vessel. In like manner, by arranging one or more other vessels at successive heights above the fourth, and increasing the capacity of the first vessel in a corresponding manner, the liquid can be raised to any desired height.

It will be evident that the liquid raised by the above-described means to any desired height may be used either as motive power or for distributing the water or other liquid at any desired levels, and for any purposes that may be required.

The accompanying drawings show diagrams of various arrangements for carrying out my before-described invention in its application to various purposes.

As the constructive details of the apparatus may be carried out in a variety of ways, such as may be readily devised by engineers, and as such details form no part of my present invention, I have not shown them on the drawings.

In the arrangement at Fig. 1 the closed receptacle or tank A, constructed to withstand a pressure corresponding to that due to the difference between high and low water levels, is arranged somewhat above low-water level, (represented by the line X,) and has, first, an escape-pipe, I, closed by a ball-cock or other known valve contrivance that will allow the water to be discharged from the vessel when the tide has sunk below it, but that will close such exit when the tide rises. The vessel has, furthermore, a stand-pipe, F, through which the water can enter it when the tide has risen to a certain extent, which pipe passes down to near the bottom of the vessel, so that no air can escape up it when its lower orifice is sealed. Lastly, the vessel A communicates by a pipe, G, with a second vessel, B, situated somewhat below high-water level. (Represented by the line Y.) This second vessel is also closed, and has a valve and float arrangement at A, to be hereinafter described, by which the air can escape from it at one time, but is prevented from escaping at another time. The vessel B in its turn communicates by a pipe, K, (in which a back valve, W, is inserted by preference,) with a third closed vessel, C, situated at a height above B not exceeding the height of B above A, and C again communicates by a pipe, L, with a fourth vessel or open tank, D, the vessel D being situated at about the same height above C as this is above B. The vessel C is provided with an opening at V, having a valve that opens inward and that is closed by a suitable float V' when the water has filled the vessel, and that will be kept closed by air-pressure within the vessel, but that will drop open when the vessel is empty or only partially filled with water; or this and the other vessels may be provided with cocks actuated by hand.

The action of the apparatus is as follows: Assuming all the vessels to be filled only with air at atmospheric pressure, and that the tide is rising, then on the water-level rising above the top of the pipe F it will flow down the same, filling the vessel A, the air from which will escape through pipe G and opening at H of vessel B. On the further rise of the tide the vessel B will also become filled through the pipe G, the air escaping through H. On the tide falling again the vessel B will remain filled, and the opening at H will be closed, as hereinafter described. The tide having sunk to low water, the contents of A will run out through the pipe I; but upon the next rise of the tide the water will again flow in through the pipe F, and the confined air compressed therein will be forced up the pipe G into the vessel B, forcing the water therein up pipe K into vessel C.

The vessel A is made of a capacity at least equal to the joint capacities of B and C, but preferably greater, so that when the whole of B's contents have been forced up into C, A will be only partially filled with water, so that by the further inflow into A the compressed air will pass from B up through pipe K into C, and, opening V being closed, will force the water up L into the tank D. Thus, by the one rise of the tide, a volume of water equal to the contents of vessel B will have been raised to a height above high-water level equal to nearly double that of the rise of the tide, and in like manner the body of water might be raised several stages higher by increasing the capacity of A in a corresponding manner. Should it be desired to raise the body of water to such increased height during a single rise of the tide, it will of course be necessary to make the passage between the vessels of such capacity that the time occupied in forcing the water from the vessel B consecutively through all the others into the highest one shall not exceed that during which the water-level remains at or about high-water line. Such successive raising of the water may, however, be effected by successive rises of the tide. In this case the water must be prevented from entering the vessel B on the tide again falling. The water and air pressure will escape from the vessel A, and the air-pressure will also escape from all the upper vessels that are filled with air, so that on the tide again rising and filling the vessel A the lower vessels, B C, will again be charged with compressed air, after which such air-pressure will continue to raise the water in the upper vessels in the manner above described.

Fig. 2 shows an arrangement, as above described, where the water is raised successively through the tanks B C D E into the tank F, which latter may be of any desired capacity, so as to have, if required, a considerable volume of water stored at that height. In this arrangement it is assumed that the said tanks are situated at some point where the water is to be utilized at a greater or less distance from the coast, estuary, or tidal river, the water being conveyed thereto by the pipe G. The vessel B, being still arranged at a height corresponding to high-water level, as at Fig. 1, the action will be just the same as there described, notwithstanding that the lateral distance between A and B may be considerable. The vessels C D, &c., may either be carried on a special structure or tower or they may be arranged on the floors of a building serving as warehouse, factory, or other purpose, as indicated by dotted lines. The water so stored at a considerable height may be used for a variety of purposes—such as for working hydraulic motor engines or cranes, turbines, or dynamo-electric machines, for purposes of manufacture, for flushing drains or sewers, for charging fire-mains, and generally for all purposes for which a head of water is applicable.

In applying the invention for the purposes of a factory for which the sea or other water (the rise and fall of which is utilized) is not applicable, the action of the tide may be utilized for raising a body of fresh water or other liquid—such as acids—to the desired height in the manner indicated at Fig. 3. Here the vessel B, which in this case may be at any level above high-water line, is connected with a supply-pipe, M, for fresh water or other liquid, and provided with a back-pressure valve, N', that will allow the ingress of the liquid; but will close as soon as B is subject to pressure. The pipe G being led up inside B to above high-water line, so that no tidal water can enter the vessel B, it will be seen that, assuming B to be filled with liquid from the pipe M, and that the tank A is being charged with water through F, as before described, the resulting air-pressure forced from A into B will cause the liquid in the latter to be raised up into the tank C, and from this it may, if necessary, be forced up into one or more higher tanks in the same manner as above described by making the capacity of A greater in proportion. Fresh water thus raised to any desired height may be used to constitute the water-supply of a town or village.

The arrangement of the valve apparatus at H, Fig. 1, is preferably similar to the arrangement shown in Fig. 4, in which the opening H is provided with a flexible diaphragm, Q, having a rod, O, connected by a lever, R', to a cock, R, in an escape-pipe, N. The rod O is connected with and operated by a lever, H', having a float, f, which is situated in the tidal water, the lever being pivoted upon a support, O', between the float and the rod O.

When the tank B is being filled by the rising tide, and the float-lever is buoyed up by the water, the diaphragm in falling by its weight will keep the escape-pipe open; but when the tide recedes the weight of the float-lever will cause the diaphragm and its rod to be pulled up so as to close the escape-pipe, so that on the next rise of the tide, when the air-pressure is forced from A into B the latter will be hermetically closed against escape of such air-pressure. The buoyancy of the float-lever is so proportioned that when the air-pressure within B is forcing the diaphragm upward, keeping the escape-pipe closed, the lever, when urged upward by the rising tide, shall not have sufficient force to overcome such contrary pressure on the diaphragm. The action of the float f upon the lever may be modified by weighting the rod O, as shown in Fig. 4, or in any other suitable manner.

According to another mode of utilizing my before-described invention, I arrange the tank B, Fig. 1, below low-water line, and I cause the water raised from it into tank D to drive a water-wheel or turbine, the tail-water from which is made to flow back into the said tank B, which is only filled in the first instance by the tidal water, and then has its contents forced repeatedly by the action of A through C up into D. Thus, no matter what may be the state of the tide, the water-wheel or turbine can always be driven by a constant head of water equal to the height from the said tank B to tank D so long as water is contained in the latter. When the water has descended from D into B, so as to fill the latter, the action of the tide upon the tank A is again brought into play for causing the water from B to be forced by the compressed air from A up into D again. The power given off by the turbine or water-wheel may be used for raising sewage from one level to another, for discharging it into the sea or tidal water, or for other purposes.

Having thus described the nature of my invention and in what manner the same is to be performed, I wish it to be understood that I do not claim, generally, the method of raising water from one level to another by the action of a head of water made to compress air in a closed vessel, which air-pressure is then made to force water from another closed vessel to a higher level, as I am well aware that such method was already applied in Hero's fountain; but

I claim—

1. An apparatus for raising liquids by the rise and fall of a body of water, said apparatus consisting of a vessel located adjacent to a rising and falling body of water, a pipe connecting said vessel with said body of water at or near low-water mark, and a second pipe connecting the same therewith at or near high-water mark, a second vessel connecting with the first through a pipe opening above the bottom of the second vessel for the passage of water and air from the first to the second, and a pipe for the delivery of the liquid from the latter tank, substantially as described.

2. An apparatus for raising liquids by the rise and fall of a body of water, consisting of the combination of a series of vessels communicating one with the other, and through which a liquid may be successively raised, and a vessel, such as A, connecting with one of said vessels by a pipe opening above the bottom of said vessel, and provided, also, with a pipe communicating with a rising and falling body of water at or near high-water level, and a valved pipe communicating with the same body at or near low-water mark, said vessel having a capacity at least equal to the joint capacities of the several vessels through which the liquid is to be raised, substantially as described.

3. The combination, with the tank A, having the pipes F and I, of the tank B, having an opening, H, provided with a flexible diaphragm operated by a lever and float, said tank B communicating with tank A through the pipe G, which opens near the top of the tanks A and B, a third vessel or tank, C, connected with B by a pipe, K, and having an opening closed by a floated valve, V', and a pipe leading from said tank C, for the discharge of the liquid, substantially as described.

In testimony whereof I have signed my name to this specification, in the presence of two subscribing witnesses, this 5th day of February, A. D. 1884.

CHARLES MAYNARD WALKER.

Witnesses:
OLIVER IMRAY,
W. J. NORWOOD,
  17 *Gracechurch St., London, E. C.*